US009052971B2

(12) United States Patent
Frank et al.

(10) Patent No.: US 9,052,971 B2
(45) Date of Patent: Jun. 9, 2015

(54) SCALABLE EVENT-DRIVEN SYSTEM

(75) Inventors: Joachin H. Frank, Goethestrasse (DE);
Ming Li, Elmsford, NY (US);
Liangzhao Zeng, Sydney (AU)

(73) Assignee: International Business Machines Corporation, Armonk, NY (US)

( * ) Notice: Subject to any disclaimer, the term of this patent is extended or adjusted under 35 U.S.C. 154(b) by 15 days.

(21) Appl. No.: 13/548,158

(22) Filed: Jul. 12, 2012

(65) Prior Publication Data
US 2014/0019995 A1 Jan. 16, 2014

(51) Int. Cl.
*G06F 3/00* (2006.01)
*G06F 9/44* (2006.01)
*G06F 9/46* (2006.01)
*G06F 13/00* (2006.01)
*G06F 9/54* (2006.01)

(52) U.S. Cl.
CPC .......... *G06F 9/542* (2013.01); *G06F 2209/546* (2013.01)

(58) Field of Classification Search
None
See application file for complete search history.

(56) References Cited

U.S. PATENT DOCUMENTS

| 5,991,806 | A | * | 11/1999 | McHann, Jr. | ................. | 709/224 |
| 7,681,204 | B2 | | 3/2010 | Demsey et al. | | |
| 7,814,500 | B2 | * | 10/2010 | Weber | ........................... | 719/314 |
| 2008/0189352 | A1 | | 8/2008 | Mitchell et al. | | |
| 2008/0189709 | A1 | | 8/2008 | Amin | | |

| 2009/0222789 | A1 | 9/2009 | Frank et al. |
| 2009/0222793 | A1 | 9/2009 | Frank et al. |
| 2009/0222795 | A1 | 9/2009 | Frank et al. |

FOREIGN PATENT DOCUMENTS

CN 101213518 A 7/2008

OTHER PUBLICATIONS

Joachim H. Frank, "A technical deep dive into the global process monitor model", URL<: http://www.ibm.com/developerworks/websphere/library/techarticles/1002_frank/1002_frank.html>, downloaded from the internet Feb. 7, 2012.
Joachim H. Frank et al., "Event-Driven Virtual Machine for Business Integration Middleware", Lecture Notes in Computer Science, 2010, vol. 6470/2010, 571-578.

(Continued)

*Primary Examiner* — H S Sough
*Assistant Examiner* — William C Wood
(74) *Attorney, Agent, or Firm* — Law Offices of Ira D. Blecker, P.C.

(57) ABSTRACT

Processing events in a distributed environment. There is provided an apparatus which includes a central queue for receiving events and tracking their progress through filtering, correlation, and update processing of stateful target objects, at least one filtering node, at least one correlation node and at least one update node. The central queue receives events in their order of arrival, each event having an entry in the central queue. Processing of events is divided into three pipelined stages in the order of filtering, correlating and updating. A result for each event of each of filtering the events, correlating the events and updating the target object is recorded in the central queue as part of the event's queue entry. The method may be performed by one or more computing devices. The exemplary embodiments detect and compensate for any erroneous results due to unsynchronized parallel processing, and guarantee an eventually correct outcome.

18 Claims, 5 Drawing Sheets

(56) References Cited

OTHER PUBLICATIONS

"IBM WebSphere Business Process Management Version 7.0 Information Center", http://publib.boulder.ibm.com/infocenter/dmndhelp/v7r0mx/topic/com.ibm.btools.help.monitor.intro.doc/intro/howmonitoringworks_intro.html, all pages, 2009.

Haase, "Java(TM) Message Service API tutorial", Sun Microsystems, Inc., Aug. 2001, XP00226306.

Andrey Brito et al., "Speculative Out-Of-Order Event Processing with Software Transaction Memory", Proceedings of the Second Confereence on Distributed Event-Based Systems, 2008, p. 265-275.

Adi, Asaf et al., "Amit 0 The Situation Manager", The VLDB Journal—The International Journal on Very Large Data Bases, vol. 13, Issue 2 (May 2004), pp. 177-203.

Adi, Asaf et al., "The Situation Manager Rule Language", presented at RuleML, 2002.

Frank, Jim H., "Jump-start business activity monitoring (BAM), Part 1:Introduction to monitor modeling", http://www-128.ibm.com/developerworks/architecture/library/ar-bam1/, Feb. 27, 2007.

Adams, Greg et al., "IBM Websphere Developer Technical Journal: A guided tour of WebSphere Integration Developer—Part 1", http://www.ibm.com/developerworks/websphere/techjournal/0602_gregory/0602_gregory.html, Feb. 22, 2006.

Frank et al., U.S. Appl. No. 12/040,461, filed Feb. 29, 2008, Information Disclosure Statements.

Frank et al., U.S. Appl. No. 12/040,461, filed Feb. 29, 2008.

Frank et al., U.S. Appl. No. 12/040,485, Information Disclosure Statements.

Frank et al., U.S. Appl. No. 12/040,485, filed Feb. 29, 2008, International Search Report and Written Opinion.

Frank et al., U.S. Appl. No. 12/040,485, filed Feb. 29, 2008.

Frank et al., U.S. Appl. No. 12/040,508, filed Feb. 29, 2008.

Frank et al., U.S. Appl. No. 12/040,508, filed Feb. 29, 2008, Information Disclosure Statements.

Bai. Lan S., et al., "Archetype-Based Design:Sensor Network Programming for Application Experts, Not Just Programming Experts", ACM, Proceedings of IPSN'09, Apr. 13-16, 2009, San Francisco, CCA, pp. 85-96.

Batory, Don, "Program Refactoring, Program Synthesis, and Model-Driven Development", Proceedings of the 16th International Conference on Compiler Construction (CC '07), 2007, vol. 4420 of LNCS, pp. 156-171.

Bhatotia, Pramod, et al., "Incoop: MapReduce for Incremental Computations", ACM, SOCC '11, Oct. 27-28, 2011, Cascais, Portugal, 14 pages.

Flanagan, David, "Java in a Nutshell, A Desktop Quick Reference", 2nd Edition, published by O'Reilly 1997, ISBN-1-56592-262-x, pp. 127-157, 227-238.

Gasiunas, Vaidas, et al., "EScala: Modular Event-Driven Object Interactions in Scala", ACM, Proceedings of AOSD '11, Mar. 21-25, 2011, Pernambucco, Brazil. pp. 227-240.

Klein, et al., "A Machine-Checked Model for a Java-Like Language, Virtual Machine, and Compiler", published by ACM Transactions on Programming Languages and Systems, vol. 28, No. 4, Jul. 2006, pp. 619-695.

Hohpe, Gregor, "Developing Software in a Service-Oriented World", published by ThoughtWorks, Inc., 2005, 11 pages.

Marth, Kevin, "Programming in the MPL-RM Programming Language", Proceedings of 43rd ACM Southeast Conference, Mar. 18-20, 2005, Kennesaw, GA, pp. 2-262-2-268.

Pope, Bernard, "Declarative Debuaging with Buddha", published in 2005 by Springer-Verlag Berlin Heidelberg, pp. 273-308.

Pothier et al., "ScalableOmniscient Debugging", published in 2007 by ACM, pp. 535-551.

Yang et al., "Clairvoyant: A Comprehensive Source-Level Debugger for Wireless Sensor Networks", published 2007 by ACM, pp. 189-204.

Zeng, et al., "Model analysis for business event processing", published by IBM System Journal, vol. 36, No. 4, 2007, pp. 817-831.

Prosecution History of related U.S. Appl. No. 12/040,485, Office Action from Chinese Patent Office, May 13, 2013, 8 pages, not translated.

Prosecution History of related U.S. Appl. No. 12/040,461, Amendments and Office Actions, Mar. 14, 2012 to Nov. 6, 2012, all pages.

Prosecution History of related U.S. Appl. No. 12/040,461, IDSs, Mar. 14, 2012 to Sep. 19, 2012, all pages.

Prosecution History of related U.S. Appl. No. 12/040,485, Amendments and Office Actions, Feb. 24, 2012 to Aug. 29, 2013, all pages.

Prosecution History of related U.S. Appl. No. 12/040,485, IDSs, May 9, 2012 to Aug. 28, 2013, all pages.

Prosecution History of related U.S. Appl. No. 12/040,508, Amendments and Office Actions, Feb. 23, 2012 to Sep. 18, 2012, all pages.

Prosecution History of related U.S. Appl. No. 12/040,508, IDSs, May 11, 2012 to Nov. 8, 2012, all pages.

Prosecution History of related U.S. Appl. No. 13/403,744, Amendments and Office Actions, Mar. 5, 2013 to Oct. 30, 2013, all pages.

Prosecution History of related U.S. Appl. No. 13/403,744, IDSs, May 11, 2012 to Oct. 1, 2013, all pages.

\* cited by examiner

1) Event e1, e2, e4, e5 have been delivered to a target object; their sequence indicators are "in ascending order".

| target object key | event | target object |
|---|---|---|
| key | e1 | t1 |
| key | e2 | t2 |
| key | e3 | t3 |
| | | |

FIG. 3A

2) Event e3 has arrived, and was determined to fall between e2 and e4; the last two target object versions have been removed.

| target object key | event | target object |
|---|---|---|
| key | e1 | t1 |
| key | e2 | t2 |
| | | |
| | | |

FIG. 3B

3) Event e3 is applied to t2, resulting in a new target object version t3.

| target object key | event | target object |
|---|---|---|
| key | e1 | t1 |
| key | e2 | t2 |
| key | e3 | t3 |
| | | |

FIG. 3C

4) Events e4 and e5 are re-applied starting from t3, resulting in t4' and then t5' as the new "current" target object.

| target object key | event | target object |
|---|---|---|
| key | e1 | t1 |
| key | e2 | t2 |
| key | e3 | t3 |
| key | e4 | t4' |
| key | e5 | t5' |

FIG. 3D

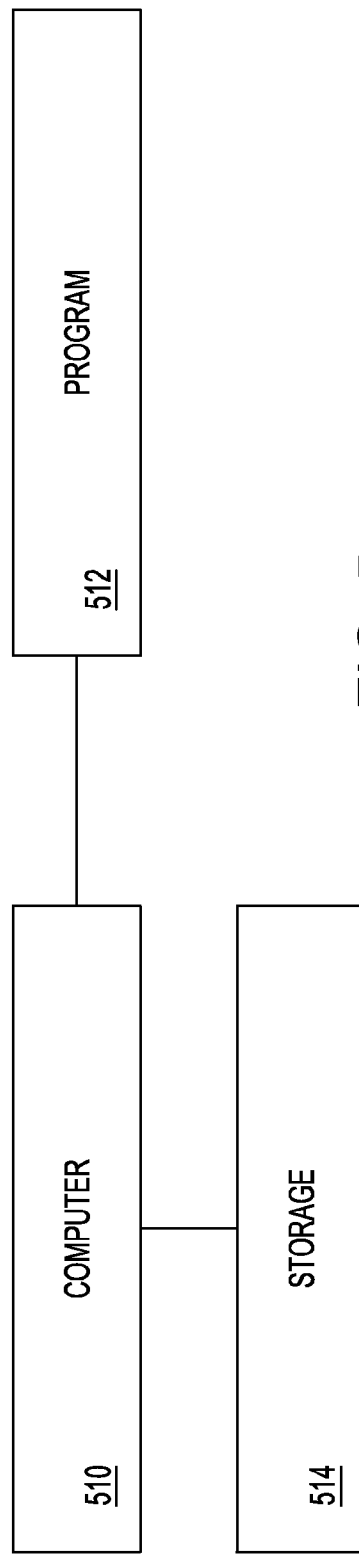

SCALABLE EVENT-DRIVEN SYSTEM

BACKGROUND

The present exemplary embodiments relate to a stateful event-driven system and, more particularly, relate to a stateful event-driven system in a distributed (parallel) environment that may detect and compensate for out-of-order updates of the state-holding target objects and erroneous correlation outcomes.

In event stream applications, events flow through a network of components that perform various types of operations such as filtering, aggregation and transformation and produce a resulting output stream. When event processing is stateless, one can trivially parallelize it by replicating the associated components. This is not possible with stateful components when there exist dependencies between the events.

For stateful processing, multiple copies of the same component would need to maintain a consistent replicated state, which is nontrivial and may add significant overhead. Also, events must often be processed in a specific order, either because they have dependencies with one another or because the effect on the component's state depends on the processing order.

While event-driven systems are gaining considerable momentum in both academia and industry, no unified architecture has been proposed for a generic stateful event processor.

BRIEF SUMMARY

The various advantages and purposes of the exemplary embodiments as described above and hereafter are achieved by providing, according to a first aspect of the exemplary embodiments, a method for processing events in a distributed environment including: providing an apparatus comprising a central queue for receiving and tracking an event, at least one filtering node, at least one correlation node and at least one update node; receiving, by the central queue, a plurality of events in their order of arrival, each event having an entry in the central queue; and dividing processing of events into three pipelined stages in the order of filtering, correlating and updating. The processing of events includes: filtering the events, by the at least one filtering node, to determine zero or more kinds for each event such that filtering the events takes place in a parallel processing environment; correlating the events, by the at least one correlating node, and applying a delivery rule to determine a set of target objects for each event that will consume the event and update their state, such that correlating the events takes place in a parallel processing environment; and updating the state-holding target objects for each event, by the at least one update node, such that updating takes place in a parallel processing environment. A result for each event of each of filtering the events, correlating the events and updating the target object is recorded in the central queue as part of the event's queue entry. The method is performed by one or more computing devices.

According to a second aspect of the exemplary embodiments, there is provided a computer program product for processing events in a distributed environment. The computer program product including a computer readable non-transitory storage medium having computer readable program code embodied therewith. The computer readable program code including: computer readable program code configured to provide an apparatus comprising a central queue for receiving and tracking an event, at least one filtering node, at least one correlation node and at least one update node; computer readable program code configured to receive, by the central queue, a plurality of events in their order of arrival, each event having an entry in the central queue; and computer readable program code configured to divide processing of events into three pipelined stages in the order of filtering, correlating and updating. The processing of events including: computer readable program code configured to filter the events, by the at least one filtering node, to determine zero or more kinds for each event such that filtering the events takes place in a parallel processing environment; computer readable program code configured to correlate the events, by the at least one correlating node, and apply a delivery rule to determine a set of target objects for each event that will consume the event and update their state, such that correlating the events takes place in a parallel processing environment; and computer readable program code configured to update the state-holding target objects for each event, by the at least one update node, such that updating takes place in a parallel processing environment. A result for each event of each of filtering the events, correlating the events and updating the target object is recorded in the central queue as part of the event's queue entry.

According to a third aspect of the exemplary embodiments, there is provided an apparatus for processing events in a distributed environment which includes a central queue component for receiving and tracking a plurality of events in their order of arrival, each event having an entry in the central queue; at least one filtering node component to determine zero or more kinds for each event received by the central queue component such that filtering the events takes place in a parallel processing environment; at least one correlating node component to correlate the events and apply a delivery rule to determine a set of target objects for each event that will consume the event and update their state, such that correlating the events takes place in a parallel processing environment; and at least one update node component to update the state-holding target objects for each event such that updating takes place in a parallel processing environment. Processing of events is divided into three pipelined stages in the order of the at least one filtering component, the at least one correlating component and the at least one updating component. A result for each event of each of filtering the events, correlating the events and updating the target object is recorded in the central queue as part of the event's queue entry. The apparatus further includes at least one computer processor for hosting the central queue, at least one filtering node component, at least one correlating node component and at least one update node component.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

FIG. 3 illustrates handling out-of-order delivery according to the exemplary embodiments.

FIG. 5 is a block diagram that illustrates one exemplary hardware environment of the exemplary embodiments.

DETAILED DESCRIPTION

Figure 1:
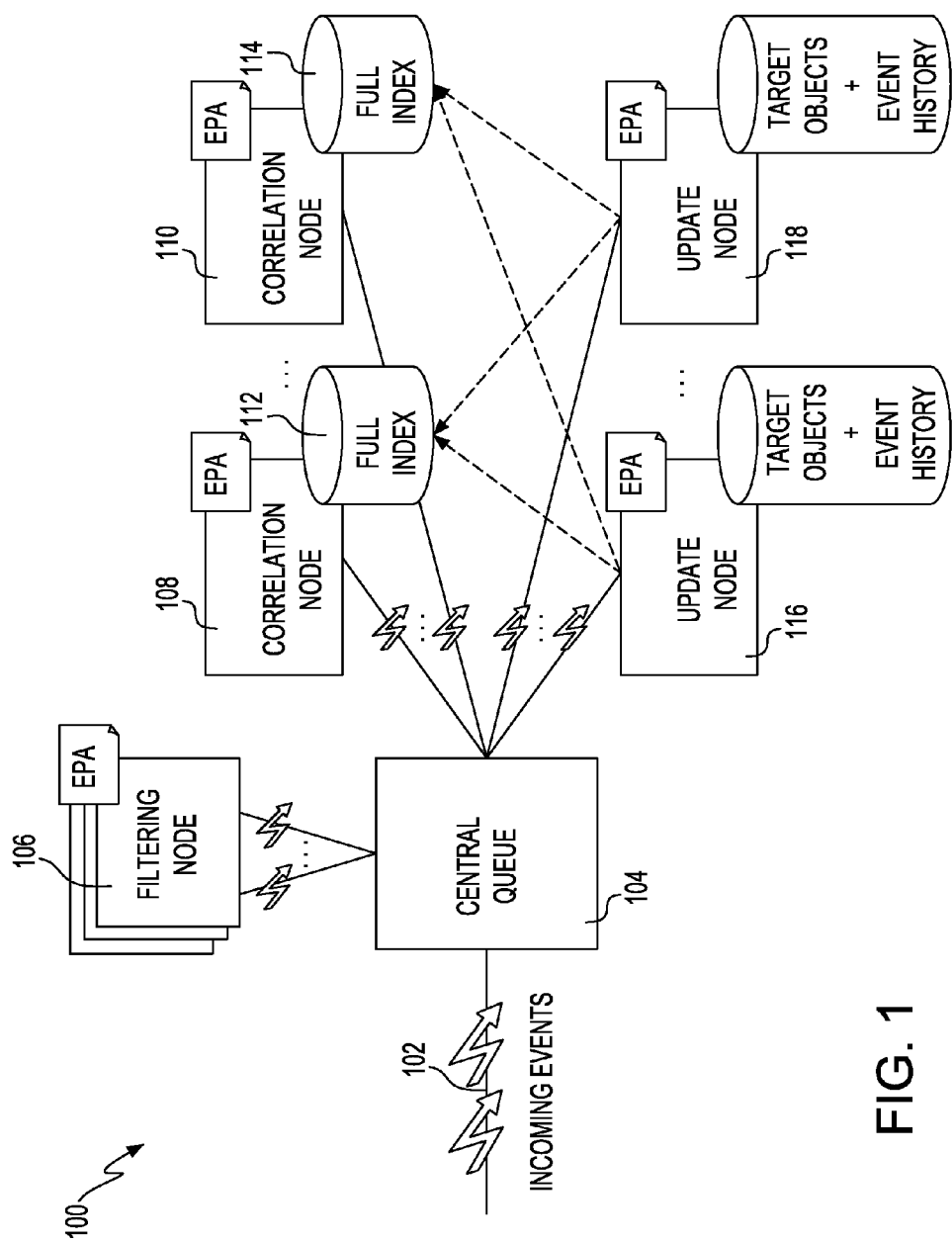
FIG. 1 illustrates a block diagram for a parallel event processing system of the exemplary embodiments.

The task of applying events to stateful target objects in a parallel processing environment is divided into (1) ensuring that correlation processing eventually delivers each event to the correct target objects, and (2) ensuring that the events delivered to each target object will update its state in the correct order. According to the exemplary embodiments, out-of-order target object updates may be detected and corrected by storing a history of events together with the resulting target object states, and using undo-redo cycles as necessary. Correlation errors may be handled by using a central "bookkeeping" queue, where all events are registered in their order of arrival. Such a queue may also be used to compensate for out-of-order arrival by inserting events according to their creation timestamps instead of just appending them. As events are then processed in parallel, their bookkeeping queue entry may be updated with the result of each step: the event classification after filtering; the target object set after correlation processing; and indicators for a possible correlation impact after target updates. When events may affect the correlation of their successors, those successors may re-enter the correlation step. If that leads to new correlation results, any prior effects of these events on the target objects are undone, and they are re-applied to the correct target object set.

The exemplary embodiments are about "stateful" event processing. The target objects are the "holders of state". Typically, an event reports state changes of "some thing" in the real world (a process, a transaction, an item, a device, etc.) and a target object holds all of the known information about that thing (data about the process, the transaction, the item, the device, etc. that the events come from and/or report about). Since an event can carry information about several "state holders" there can be more than one target object. For example, an event reporting "customer went out of business" may affect the state of all purchase orders from that customer that are currently being processed.

Since target objects may be large, they may not be replicated to the correlation nodes and may not be put on the central queue. Only their keys (identifiers) are replicated and put on the central queue. A correlation node holds indexes that map target object attributes that are used for correlation to target object keys, and the target object sets T are collections of such keys.

Given a target object key, the update node that holds the object proper may be determined through a hash function.

The following is a simple example illustrating an event processing algorithm as well as the problems that may result from a parallel implementation.

It is assumed that a book store has tagged all books with RFID tags. As books are moved around the store, five kinds of events may occur: (1) book put on shelf, (2) book taken off shelf, (3) book paid at checkout, (4) book leaves store, and (5) book enters store. These five kinds of events may be referred to as "on shelf", "off shelf", "paid", "leave" and "enter".

The store's inventory system receives and processes all of these events. When the first event from a new book is received (it typically will be "enter") a new target object is created to track this book. A typical event sequence may then be: enter—on shelf—off shelf—on shelf—off shelf—paid—leave. According to this event sequence, the book was brought to the store, put on the shelf, taken off the shelf and put back on, later taken off a second time, paid for, and carried out of the store. That's a normal event sequence for a book that was looked at and finally purchased. Now, if a "leave" event occurs without a preceding "paid" event, a shop lifting incident may have been detected. But in a parallel processing environment, the "paid" event could well be delayed and so the "leave" event could reach the target object (which tracks the book's whereabouts) before the "paid" event, which would result in a false shop-lifting alert. Such out-of-order event arrival is inevitable in a parallel processing environment. That is, while the "paid" event is stuck at some processing stage, it cannot be determined whether the paid event "is on its way" or "was never issued". But when the "paid" event finally is processed, it is expected that the system will detect the error and correct for the false alert. The book must be logged as purchased, not as stolen, which may be achieved by storing the event history for each target object, so that when the "paid" event arrives, the target object update algorithm detects that the "leave" event was processed prematurely, undo that, and then process "paid" and "leave" in the right order.

To illustrate the problems with correlation in a parallel processing environment, it is assumed that book purchases are also tracked by author: A target object for each author is created when his or her first book is sold, and updated by all "paid" events for books that he or she wrote. Now, assume the first book of new author Herbert Newman just came in, and was also discussed on yesterday's late night show. Thus it sells big on its first day in the store, and the first two "paid" events for Herbert Newman, coming from, say, check-out lines 2 and 7, occur at the same time. They are processed in parallel, in different threads. Each thread finds that a tracking object for Herbert Newman does not exist, creates one, and logs the first purchase in that object. Two tracking objects occur for our new author instead of one, merely due to the coincidence of the "paid" events at checkouts 2 and 7 and the fact that those events are processed in parallel. To detect and correct this situation, all events may be logged in a central queue. The two "paid" events for Mr. Newman's book would end up in the queue in some sequence, even though they were produced around the same time. Assume the event from check-out line 7 is logged first. The log entry is updated with the result of filtering (indicating that this was a "paid" event) and finally the correlation result (indicating that "no target object was found, hence a new target was created"). The algorithm knows that new-object-created actions can have an impact on the correlation of subsequent events, and thus decides that the "paid" event from check-out line 2, which ended up later in the queue, must be processed again. The second pass for that event will now detect the "Herbert Newman" target object created by the "paid" event from check-out line 7, undo the effects of the first pass (that is, delete the duplicate tracking object for author Herbert Newman) and update the first tracking object with the second purchase.

Note that while such undo-redo operations are costly, they are also rare. In the above example, only the "no author object found→new object created" result affects the correlation of subsequent "paid" events, and that's a once-in-a-lifetime event for each author. Furthermore, candidates for retry are only events that enter the system after the first event was received and before it was processed completely. That's usually a very short time window. Future purchasing events can be processed in any order, so that another retry-trigger (for this author) will not occur.

The exemplary embodiments pertain to a parallel implementation of an event processing system where events are received by subscribing target objects and updating their state. Incoming events may be processed in three steps: (1) filtering—determine the kind of an incoming event, (2) correlation—identify the event's target object(s), and (3) target update—update the target object(s).

Formally, the behavior of the event processing system may be governed by an event processing algorithm (EPA) which may be written as a list of tuples (an ordered list of elements):

$$(f_i, cp_i, dr_i, u_i), i=1, \ldots, F$$

where
- a filter expression $f_i(e)$ is a Boolean expression that is evaluated for every event and tests the event to be of some kind (classifies it). The event is said to "pass the filter" when the result is true, and then is known to be of some kind/fall into the class of events that this filter identifies.
- a correlation predicate $cp_i(e,t)$ is a Boolean expression that depends on an event e and a target object t; the event is said to "match the target" if the result is true. Correlation processing determines the set T of all target objects t for which $cp_i(e,t)$ is true. The size of that set is called the event's match count.
- an event delivery rule $dr_i(n)$ maps the set {0, 1, many} to one of
  {"ignore", "create new target", "raise exception", "deliver to any", "deliver to all", "retry"};

The following are some examples of delivery rules. If the event matches no target, create a new target object (e.g. events that signal a process start; the new target object tracks the new process execution). If the event matches one target, deliver the event to that target (e.g. an event reporting the completion of a process execution; there should be exactly one target object holding that process execution's state). If the event matches multiple targets, raise an exception (e.g. events reporting the completion of a transaction; there should be just one transaction to which such an event applies, not multiple). If the event matches one target, ignore it (e.g. several events reporting the close of a sale arrive in succession; only the first is needed; the 2nd, 3rd, etc. event matching the same target object (reporting the same deal) are redundant). Note that an event may or may not be delivered to a matching target object. For example, if a "new execution started" event is received by a process monitor, where the purpose of target objects is to monitor process executions, the expectation is that no matching target object exists at that time and a new observer object should be created to monitor the new process run. If unexpectedly a matching target is found, an exception should be raised indicating a duplicate process instance id.

The event delivery rule is applied to the target match count, and the outcome determines the event's disposition. The target match count is the number of target objects for which the correlation predicate is true. The event may then be delivered to none, all, or some of these "matching" objects, depending on the delivery rule specified in the current EPA tuple.
- an update instruction $u_i(e,t)$ maps an event e and a target object t to an updated target t'. When the update function returns null the target object t is marked for removal. It will be removed from the target object pool when the event has been processed completely.

In summary, the EPA tests an incoming event against all filter expressions $f_i(e)$, one at a time. If the event passes a filter, the corresponding correlation predicate $cp_i(e,t)$ is evaluated for all target objects, and the target matches are counted. The event delivery rule $dr_i(n)$ is then evaluated, and if the event is to be delivered to one or more targets, the update function $u_i(e,t)$ is used on each.

In the exemplary embodiments, the EPA may be implemented in a distributed, interconnected system in a scalable fashion.

Referring to the Figures in more detail, and particularly referring to FIG. 1, there is illustrated a block diagram for a parallel event processing system 100. Incoming events 102 are registered in a central queue 104. An event may remain in this central queue 104 until it is the oldest event that was fully processed. At that point, the oldest event may be removed. The steps of the EPA of filtering, correlation and target updating may be parallelized. There may be any number of processing nodes for filtering, for correlation, and for target updates. As shown in FIG. 1, there are three filtering nodes 106, and multiple correlation nodes 108, 110 are shown. It is assumed that each correlation node 108, 110 has access to a full index 112, 114, respectively, which contains all the information the correlation node 108, 110 needs to calculate target object sets. It is also assumed that each update node 116, 118 is responsible for some subset of the target objects, which may be distributed amongst the update nodes 116, 118 by, for example, mapping the object keys into hash buckets.

Correlation nodes evaluate correlation predicates (Boolean expressions) on all target objects. In practice, this amounts to queries like "SELECT target object keys WHERE correlation predicate is true". Such queries are greatly helped by indexes on those target object attributes (=columns) that are used in those queries. A full index is an index comprising all known target objects—in contrast with the partial set of target objects stored on each update node. While each update node may operate on a fraction of the target objects, each correlation node uses (one or more) indexes on the full target object set.

The results of processing an event by the filtering node 106 are provided back to the central queue 104 and stored in the event's queue entry. In a similar manner, the results of processing an event(s) by the correlation nodes 108, 110 are provided back to the event's entry in the central queue 104 and some information about processing an event(s) by the update nodes 116, 118 are provided back to its entry in the central queue 104. The result of update processing may be new/updated target objects. These are not provided back to the central queue. What is provided back to the event's central queue entry is one bit of information per target object that was created, updated, or deleted: it is true if the update could affect the correlation of subsequent events (and false otherwise). The central queue may then keep track of the events and record intermediate results (as detailed below) after processing by each of the filtering node 106, correlation nodes 108, 110 and update nodes 116, 118.

Figure 2:
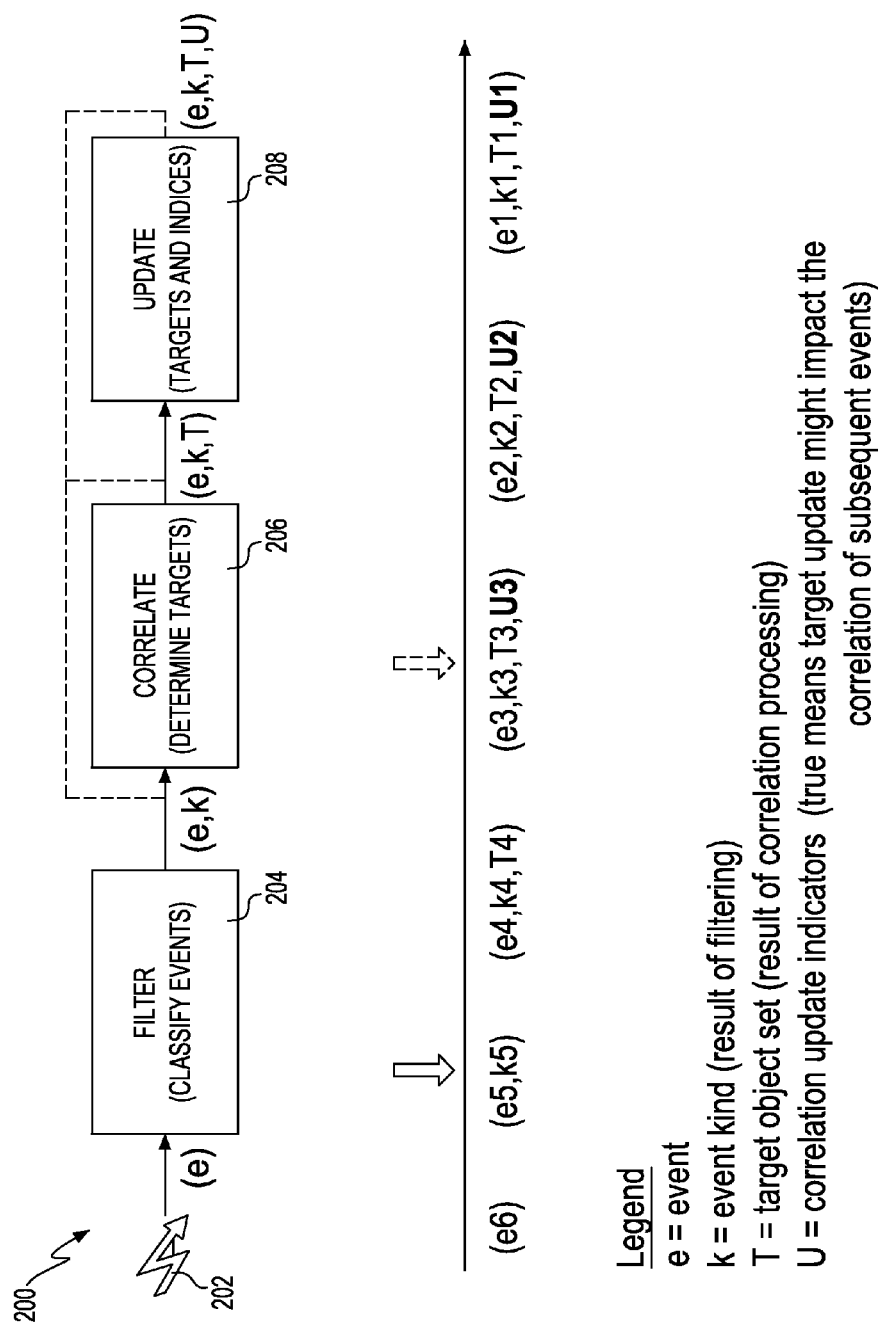
FIG. 2 illustrates a processing pipeline of an event being processed according to the exemplary embodiments.

Referring now to FIG. 2, there is shown a processing pipeline 200 of an event 202 being processed. The filter 204 classifies the event 202 by determining its "kind". Using the bookstore example describe previously, event kinds may include, for example, "book enters store", "book on shelf", "book paid", "book leaves store", etc. An event may also have multiple kinds, for example, when it reports multiple real-world occurrences. Events that match more than one filter 204 may be replicated (cloned) resulting in one pair (e, k) for each filter that was passed. Each pair (e, k) may then only be processed by one EPA tuple ($f_i$, $cp_i$, $dr_i$, $u_i$). The clones may be put in the central queue 104 (FIG. 1) in the order of the filters 204 that produced them.

The correlation 206 determines the set T of target objects for the event 202 by first evaluating the correlation predicate and then applying the event delivery rule. The correlation predicate is evaluated based on the current state of the targets and any indexes used in this step.

The target objects may be updated 208, and an update indicator vector U at the event's queue entry (with one flag per target object) shows which updates might affect subsequent event correlation: the entry for a target is true if attributes were changed that are used in correlation predicates. These attributes are determined by analyzing all correlation predicates of the EPA up front when the EPA is loaded into the system.

If events 202 move through the processing pipeline 200 one-at-a-time (the "slow-motion" scenario) then correlation of course is always based on an up-to-date state of the target objects and any indices (all updates have been completed and disseminated before the next event is correlated) and events 202 are processed at their targets in the same order in which they were received. When events 202 are processed through the processing pipeline 200 one-at-a-time, the expected result of event processing according to the EPA is produced. However, if parallel processing is employed, then both of these conditions may be easily violated. That is, events 202 may be correlated based on indices or target objects which are not up-to-date, which can lead to incorrect event deliveries or the creation of redundant (duplicate) targets. In addition, the order in which events 202 are consumed by their targets and those targets' states updated may be different from the order in which they entered the pipeline.

In the exemplary embodiments, an algorithm will be described that permits parallelism at each stage, but eventually leads to the same target states that would have resulted from strictly sequential processing. The algorithm address the foregoing issues by (1) rerunning the correlation for subsequent events when a prior event has changed any correlation-relevant attributes, and (2) rearranging events at a target object, even after they've already been consumed, when out-of-order delivery is detected.

Handling out-of-order delivery will be discussed first. Referring now to FIGS. 3A to 3D, the algorithm to ensure that events are consumed by their target objects "in the right order" is illustrated. Events may carry an indicator (for example, a timestamp, sequence number, etc.) that may define the order, or partial order, in which the events are expected to be processed. Based on that indicator, and with the history of events already consumed at hand, local processing at a target object may determine if a new event is actually next-in-line, or where it should be inserted into the sequence of events already consumed.

If correlation processing sends each event to the "right" target objects, regardless in which order, then any out-of-order issues may be solved locally at each target object, by the node that holds and manages that object. The central event queue is only used to ensure that correlation processing results in an eventually correct delivery of events to their target objects. The out-of-order processing algorithm described herein then corrects any scrambled event order, which does not involve the central queue.

As shown in FIGS. 3A to 3D, a history of target object updates is stored together with the events that caused these updates. When an event arrives that based on its sequence indicator should have been processed earlier, the results of all events with higher sequence numbers (later timestamps) are removed from the history. The removed results may be stored temporarily in a LIFO store ("stack") held locally at the update node that holds the target object. The new event is processed, and then all events whose results were undone are re-processed.

Thus, in FIG. 3A, events e1, e2, e4 and e5 have been received in this order, and their processing has led to target object states t1, t2, t4, and t5. Later on, as shown in FIG. 3B, event e3 has been received out-of-order. It is determined that event e3 falls between events e2 and e4 so events e4 and e5 are removed. In FIG. 3C, e3 is added with a new target object t3, which resulted from processing e3 in the context of t2. Then, in FIG. 3D, events e4 and e5 are re-applied, resulting in new target objects t4' and t5'.

An important advantage of the exemplary embodiments is the following: For eventually correct event processing, it suffices to (1) deliver each event to the "right" target objects (that is, the objects that would have received the event in a slow-motion scenario, where events are processed one at a time) in any order; and (2) locally at each target object, process the events in the correct order, compensating for potential duplicates or out-of-order arrivals. The preceding paragraphs described the algorithm for (2). The following paragraphs will describe how to accomplish (1).

Handling correlation in a distributed event processing environment will be discussed next. When the process pipeline in FIG. 2 is parallelized, and a distributed object store is used for target updates, an event may be correlated before the effects of a preceding event have been propagated to the node and index used for this correlation. This may result in correlation errors such as (1) an event not being delivered to a target object it should have been delivered to, (2) an event being delivered to a target object it should not have been delivered to, or (3) a new target being created when instead the event should have been delivered to an existing target.

To detect and correct such correlation errors, the event processing system may be modified such that:

All events are placed in a central queue, in their order of arrival, or according to an event sequence indicator (for example, a creation timestamp);

Each event's queue entry may be updated with the results of filtering and correlation, which may be performed for many events in parallel;

If update processing creates a new target object or changes any target attributes used for correlation, all events after the one that caused this update may be re-correlated; and The results of a correlation rerun are compared with those of the preceding run, and only if a different target set is found is the discrepancy corrected.

A few notes on performance and scalability before this procedure is described in more detail:

1. While it may seem costly to rerun correlation and target updates for all events succeeding one that may have affected the correlation of its successors:

New target object creation is relatively rare, and target object updates that change correlation attributes—which are typically write-once keys—are even more rare in practice; the vast majority of events will not affect the correlation of their successors.

Subsequent events destined for different targets (events that are unrelated to the one that caused the correlation-affecting updates) will see no changes upon re-correlation. No further processing of those events is needed.

The only events re-submitted for correlation are the ones that entered the queue after the event causing the correlation-affecting updates and before the time when all of those updates have been completed and propagated. If update processing is fast, this can be a very small time window.

2. While the use of a central event queue ultimately limits the scalability of the system, all compute-intensive operations (filtering, correlation, target updates) may be performed by clusters of machines. The central queue only holds status information and intermediate results of the distributed event processing pipeline.

3. The central queue decides which events must be re-correlated when correlation-relevant data was updated.
4. The performance of distributed event processing systems is usually governed by the number of network hops, because inter-node communication is far more expensive than local processing or disk access. The number of network hops per event in the event processing system of FIG. 1 is:

2 [for filtering]+
2 [for correlation]+
2×(# target nodes) [for update processing]

The number of target nodes is typically 1, so that the number of network hops is 6 and will not grow with the size of the event processing system. An exception may be for events that must be delivered to many or all of the target objects. For those, the number of network hops is:

2+2+2×(# update nodes)

which grows linearly with the number of update nodes.

Described now is a more detailed description of the algorithm leading to "eventually correct" event delivery. There may be four distinct steps in the process. FIG. 2 is again used for the purpose of illustration.

Step 1

Events arriving at the event processing system are put in a central queue (104 in FIG. 1). FIG. 2 shows six events (e1-e6) in the central queue, which are at various stages of processing through the filtering node 204 (106 in FIG. 1), correlation node 206 (108, 110 in FIG. 1) and update node 208 (116, 118 in FIG. 1).

Step 2

Events in the central queue that have not been filtered (e6 in FIG. 2) enter the filtering stage 204, which is trivial to parallelize. Any number of nodes can fetch an event, evaluate the EPA's filter expressions and tag the event with the resulting "event kinds". Event e5 has completed the filtering stage. If the event passes no filter, it is discarded, that is, not processed any further, because it did not meet any of the classifications of the EPA. If the event passes more than one filter, a clone (i.e., a new queue entry) is created for each filter that is passed and tagged with the event kind detected by that filter. For example, the classified clones $(e,k_1)$, $(e,k_2)$ are put in the queue in the order of the filters that produced them. As a result, each classified event is only processed by exactly one $(f_i, cp_i, dr_i, u_i)$ tuple.

Step 3 (Correlation, without Reprocessing or Exceptions)

Events in the central queue that have been filtered but not yet correlated (e5 in FIG. 2) enter the correlation state 206, which again may process multiple events in parallel through nodes 108, 110 in FIG. 1. Each correlation node 108, 110 may work with its "currently known" set of target objects (and any related indices) which may not yet reflect all impending changes.

Correlation processing completes by applying the event delivery rule to the match count, which yields the set T of target object identifiers. The correlation nodes do not hold target objects proper, but indexes that map target object attributes to target object identifiers (or keys). These identifiers uniquely identify target objects, and (through a hash function) allow to pinpoint the update node that holds a target object. If a new target must be created, a new unique identifier is generated at this point and stored in the set T of target object identifiers. The new target object identifier will be set in the new target object during update processing. The set T of new or existing target object identifiers is attached to the classified event's central queue entry. Event e4 in FIG. 2 has reached this stage.

Step 4 (Update, without Reprocessing or Exceptions)

Events in the queue that have been filtered and correlated (e4 in FIG. 2) enter the update step. Parallelism may now be applied both for one event that has multiple targets, as well as amongst all events that are ready for update processing. Update processing includes updating the target object proper, as well as any indices used for correlation.

By analyzing the expressions in every $(f_i, cp_i, dr_i, u_i)$ tuple of the EPA as it is loaded into the system, it may be determined if the execution of this tuple may affect the correlation of subsequent events. That is the case when (a) a new target object is created; (b) a target object is marked end-of-life and will be removed; or (c) target object attributes that are used in correlation processing are updated.

If any of these conditions is true, the update indicator for the target object is set to true in the event's central queue entry after all updates have completed, otherwise it is set to false (the update indicator flags are collectively denoted by $U_i$ in FIG. 2). When all update-indicators have been set, update processing for the event is finished.

U3 in FIG. 2 denotes a partially completed update procedure. Update processing for event e3 is still in progress and some indicators have not been set. U2 in FIG. 2 denotes a completed update procedure for e2 with at least one indicator being true, meaning that correlation processing for subsequent events may have been affected. U1 in FIG. 2 denotes a completed update procedure for e1 where all indicators are false meaning that the correlation of subsequent events is not affected.

Steps 3 and 4 as just described did not take potential retries into account, and therefore may have to be revised. For the full algorithm, the seven states that an event entry may have on the central queue are defined more in detail than in FIG. 2. The more defined states are:

1. (e)—new, not yet processed
2. (e,?)—filtering in progress
3. (e, k, . . . , (_,_))—filtering completed, ready for correlation
4. (e, k, . . . , (?,_))—correlation in progress
5. (e, k, . . . , (T,_))—correlation completed, ready for update processing
6. (e, k, . . . , (T,?))—update processing in progress
7. (e, k, . . . , (T,U))—update processing completed The three dots stand for any number of (T,U) pairs from previous correlation attempts, which may be at various stages of correlation and update processing, or completed. If no retries are started, the states 1, 3, 5, 6, 7 are easily matched with those shown in FIG. 2.

Steps 3 and 4 as described above are repeated here but with reprocessing.

Step 3' (Correlation, with Reprocessing and Exceptions)

A central queue entry in state 3 is picked up by a correlation node for processing. Its state is changed to 4, to indicate that correlation is in progress.

Correlation processing is performed as described in Step 3 above. When it completes, the resulting target object set T is added to the queue entry in the same position in which the "?" was put when correlation started because the list of (T,U) pairs may have grown longer in the interim if new retry attempts have been launched.

If the event delivery rule said "ignore", "retry", or "raise exception", the target set is empty. If the event delivery rule said "retry", then the event is resubmitted to the beginning of the central queue—potentially after a configurable wait time. If it said "exception", an exception is raised and logged by the event processing system.

Step 4' (Update, with Reprocessing)

A queue entry in state 5 is ready for update processing. If there is no preceding (T,?) or (T,U) pair, that is, if update processing has never been started for this event, its target object set is just the T in the last pair, and the event is dispatched to every update node that manages one or more of those objects. Otherwise, the target object set $T_{old}$ of the closest preceding pair for which update has been started or completed is compared with the new set of target objects $T_{new}$ to see if the target set has changed. If not, there is nothing more to do, because the updates of targets in $T_{old}$ are already in progress. If it has changed, the event is sent to all target objects in $T_{new}$-$T_{old}$ (those target objects not covered by the previous target set) and sent with an undo request to all target objects in $T_{old}$-$T_{new}$ (those target objects erroneously covered by the previous target set).

The event entry's state is changed to 6 (update in progress) and update processing is performed as described in Step 4 above. Undo requests are processed by rolling the update history back to the point before this event was applied (if it was the first event, the target is deleted) and then redoing it with that event left out. If the event to be undone has not yet arrived (that is, the "undo" request got ahead of the "do" request) then the undo request is stored locally at the target object and executed when the "do" request comes through—by simply ignoring that. When update processing completes for a target object, the corresponding update indicator is set to true or false, depending on whether or not the correlation of subsequent events may have been affected (see Step 4 above).

When the update indicator in a queue entry's last (T,?) pair is set to true, re-correlation is launched for all subsequent events by putting all newer queue entries that are in states 4-7 back into state 3 by appending a new (_,_) pair:

(e, k, . . . , (?,_))→(e, k, . . . , (?,_), (_,_))
(e, k, . . . , (T,_))→(e, k, . . . , (T,_), (_,_))
(e, k, . . . , (T,?))→(e, k, . . . , (T,?), (_,_))
(e, k, . . . , (T,U))→(e, k, . . . , (T,U), (_,_))

The threads that are still processing the now second-to-last pairs and any preceding ones (that is, one of (?,_), (T,_), (T,?), or (T,U) depending on how far along the event got in the pipeline), be it for correlation or for update, will eventually complete. If their target object set was already "the right set", no correction will be staged when it is compared with the recalculated target object set that will be filled into the last (_,_) entry. But any changes in the target object set will be corrected when the pair in the last position is filled in—as just described. Note that if preceding pairs have completed correlation but not been picked up by an update node when the correlation retry is launched, no update will be started based on their now "obsolete" correlation set. It will be ignored, in favor of the newer target object set that at some point will appear in the last (T,_) entry, because update threads only pick up the latest correlation result they find on the central queue.

Step 5 (Clean-Out)

As mentioned earlier, the oldest event entry may be removed from the queue as soon as it was fully processed (has reached state 7). This rule is applied recursively.

Cloned event entries produced by a filtering step are removed together when all members have reached state 7.

Here is why the retry attempts won't cause infinite loops, that is, the central queue will keep moving forward: The oldest queue entry (or entries, forming a group of clones) has no predecessor that could send it back to state 3; hence it will eventually reach state 7 and be removed. Then its predecessor becomes the oldest entry, and the same logic applies.

Example

Figure 4:
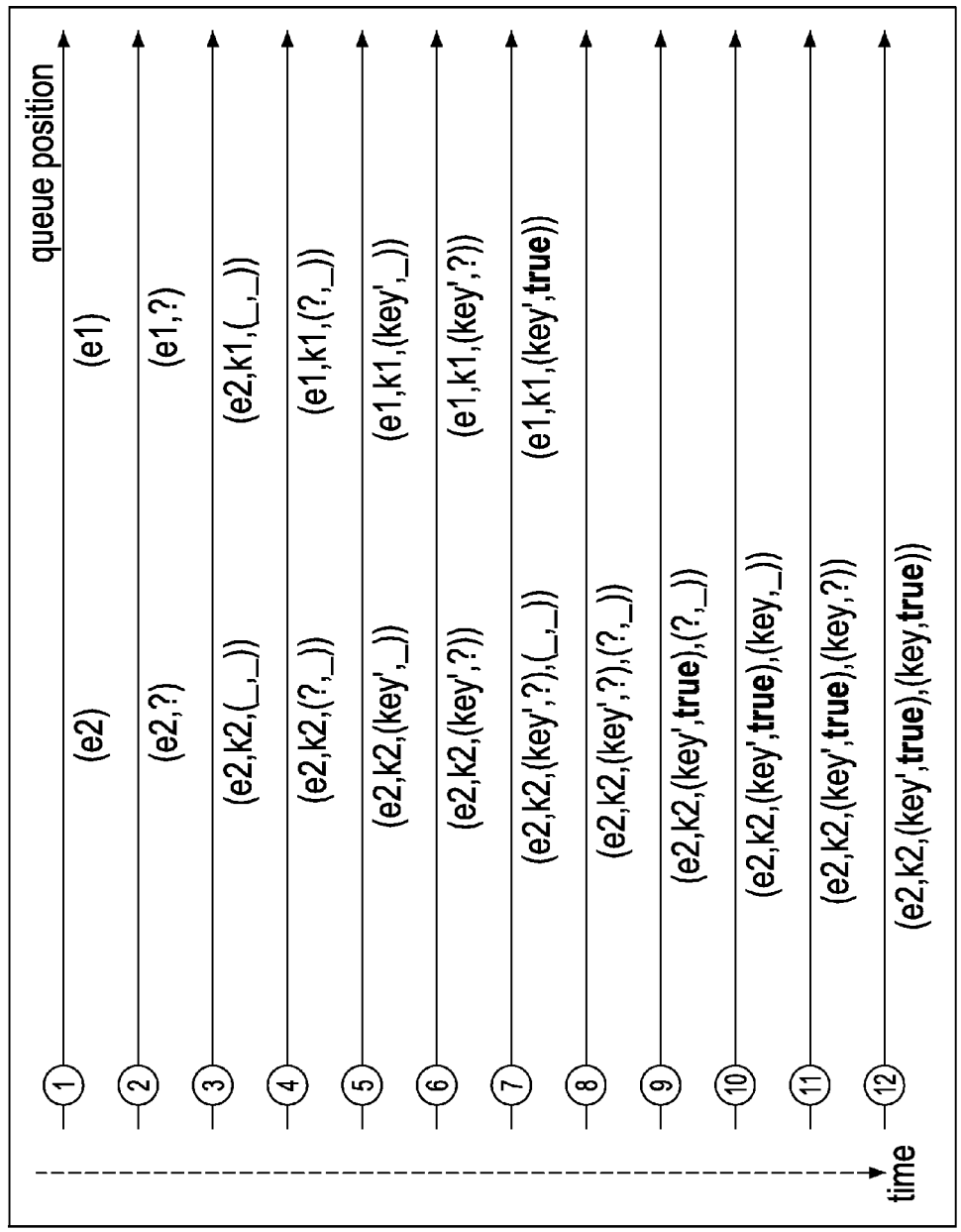
FIG. 4 illustrates an example of two events that are processed according to the exemplary embodiments.

Referring now to FIG. 4, there is illustrated the exemplary embodiments using an example of two events that are destined for the same target object. It is assumed that the two events arrive in close succession. Either event will create the target if it does not exist, the other event must then be delivered to that target. FIG. 4 shows how the processing and content of the event central queue develops over time.

Time 1: It is assumed that event e1 arrived slightly earlier than event e2 and thus ended up in a higher queue position.

Time 2: Two filtering nodes have picked up the two events and evaluate the filter expressions to determine their kinds.

Time 3: Event kinds k1 and k2 have been determined for events e1 and e2, respectively. Both events are now ready for correlation processing.

Time 4: Two correlation nodes have picked up the two event entries. Both come to the conclusion that a target object does not exist, and generate a key for a new target, to be created and initialized by the update step. This is where the parallel processing leads to an erroneous condition: two new target objects will now be created instead of one; that condition must be detected and corrected.

Time 5: The correlation nodes have written the target object sets {key} and {key'} back to the central queue entries they processed respectively. Both entries are now in state 5, ready for update processing.

Time 6: Two update nodes have picked up the two events. The update nodes find a non-existing key in the target object set and, accordingly, each update node creates a new target object with that key. The update nodes initialize the new object from the content of the event, according to the EPA's update instructions for a new target.

Time 7: Update processing for event e1 has finished. Since a new target object was created, the update indicator for {key} is set to true. As described in Step 4', all later events in the queue that are in states 4 to 7 are instantly put into state 3 (ready for correlation) by appending a new (_,_) pair. The queue entry for e2 is modified accordingly.

Time 8: Two things have happened. The entry for event e1, which had reached state 7, was cleaned up according to Step 5, and a correlation node has picked up the entry for event e2, which thus advanced from state 3 to state 4.

Time 9: Update processing for the (redundant) target object {key'} has completed. Since a new target object was created, the update indicator is true once again. But since this entry is in state 4, and not in state 7, this has no effect. Note that if this update had finished first, the entry for event e2 would now have reached state 7 but this still would not have had any effect because there are no newer events in the queue whose correlation might have to be corrected.

Time 10: The re-correlation step for event e2 has finished. The re-correlation found the target object {key} created from event e1, and determined that event e2 should be delivered to that same target. The central queue entry for e2 has reached state 5 again and is ready for update processing.

Time 11: An update node has picked up the central queue entry for event e2. According to Step 4' above, the new and old target object sets are compared, with the following result:

$T_{new}$-$T_{old}$={key}
$T_{old}$-$T_{new}$={key'}

Hence event e2 is sent to the target object {key} for update processing and to {key'} with an undo request. Since event e2 created object {key'}, the undo request will remove it.

Time 12: The corrective update processing for event e2 has completed. While the updates to the target object {key} may not have changed any correlation-relevant attributes, the removal of the redundant target object {key'} still warrants a "true" setting of the update indicator. That has no effect, however, because there are no later events in the queue. The entry for event e2 is now the oldest in the central queue and has now reached state 7. It may be removed by clean-up processing.

As a result of the just-described processing, the duplicate target object was removed and event e2 was eventually delivered to the correct target object {key} which it had missed in the first round of correlation processing when the effects of that object's creation had not yet been propagated through the system.

The program environment in which the exemplary embodiments may be executed illustratively incorporates a general-purpose computer. FIG. 5 is a block diagram that illustrates one exemplary hardware environment of the present invention. The exemplary embodiments may be implemented using a surface computer 510 including a computer processor, random access memory (RAM), read-only memory (ROM) and other components. Resident in the computer 510, or peripheral to it, will be a storage device 514 of some type such as a hard disk drive, floppy disk drive, CD-ROM drive, tape drive or other storage device.

Generally speaking, the software implementation of the exemplary embodiments, program 512 in FIG. 5, is tangibly embodied in a computer-readable medium such as one of the storage devices 514 mentioned above. The program 512 includes instructions which, when read and executed by the computer 510 causes the computer 510 to perform the steps necessary to execute the steps or elements of the exemplary embodiments.

As will be appreciated by one skilled in the art, aspects of the exemplary embodiments may be embodied as a system, method, service method or computer program product. Accordingly, aspects of the exemplary embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the exemplary embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the exemplary embodiments may be written in any combination of one or more programming languages, including an object oriented programming language such as Java, Smalltalk, C++ or the like and conventional procedural programming languages, such as the "C" programming language or similar programming languages or even Microsoft Excel/Access. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the exemplary embodiments have been described above with reference to flowchart illustrations and/or block diagrams of methods, apparatus (systems) and computer program products according to the exemplary embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the Figures illustrate the architecture, functionality, and operation of possible implementations of systems, methods, service methods and computer program products according to the exemplary embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A method for processing events in a distributed environment comprising:
    providing an apparatus comprising a central queue for receiving and tracking an event, at least one filtering node, at least one correlation node and at least one update node;
    receiving, by the central queue, a plurality of events in their order of arrival, each event having an entry in the central queue;
    dividing processing of the events into three pipelined stages in the order of filtering, correlating and updating, the processing of events comprising:
        filtering the events, by the at least one filtering node, to determine zero or more kinds for each event such that filtering the events takes place in a parallel processing environment;
        correlating the events, by the at least one correlating node, and applying a delivery rule to determine a set of state-holding target objects for
    each event that will consume the event and update their state wherein the target objects hold all known information about the events, such that correlating the events takes place in the parallel processing environment; and
        updating the state-holding target objects for each event, by the at least one update node, such that updating takes place in the parallel processing environment;
    wherein a result for each event of each of filtering the events, correlating the events and updating the target objects is recorded in the central queue as part of the event's queue entry, wherein the updating for each event includes one bit of information for each target object provided to the central queue to indicate that the update would affect the correlating of events subsequent to the each event and wherein the method is performed by one or more computing devices.

2. The method of claim 1 wherein in the step of filtering the events, each event is tagged with its kind.

3. The method of claim 1 further comprising detecting out-of-order processing of an event and correcting the out-of-order processing by storing an event history for each target object together with that target object.

4. The method of claim 1 wherein if updating the target object for a particular event results in: a new target object being created, a target object being marked end-of-life, or a change to any target object attributes that are used in correlation expressions, then further comprising repeating correlating all events after the particular event.

5. The method of claim 4 further comprising correcting the event's central queue entry with respect to the set of state-holding target objects if a different set of state-holding target objects is found by a repeated correlation, and correcting the event's effect on all target objects by processing undo requests for any target objects that the corrected set of state-holding target objects no longer contains.

6. The method of claim 1 wherein there is only one central queue for receiving and tracking an event and there are a plurality of filtering nodes, a plurality of correlation nodes and a plurality of update nodes and wherein the processing of events in the pipelined stages of filtering, correlating and updating are done in the parallel processing environment.

7. A computer program product for processing events in a distributed environment, the computer program product comprising:
    a computer readable non-transitory storage medium having computer readable program code embodied therewith, the computer readable program code comprising:
        computer readable program code configured to provide an apparatus comprising a central queue for receiving and tracking an event, at least one filtering node, at least one correlation node and at least one update node;
        computer readable program code configured to receive, by the central queue, a plurality of events in their order of arrival, each event having an entry in the central queue;
        computer readable program code configured to divide processing of events into three pipelined stages in the order of filtering, correlating and updating, the processing of the events comprising:
            computer readable program code configured to filter the events, by the at least one filtering node, to determine zero or more kinds for each
        event such that filtering the events takes place in a parallel processing environment;
            computer readable program code configured to correlate the events, by the at least one correlating node, and apply a delivery rule to
        determine a set of state-holding target objects for each event that will consume the event and update their state wherein the target objects hold all
        known information about the events, such that correlating the events takes place in a parallel processing environment; and
            computer readable program code configured to update the state-holding target objects for each event, by the at least one update node, such
        that updating takes place in the parallel processing environment;
        wherein a result for each event of each of filtering the events, correlating the events and updating the target object is recorded in the central queue as part of the event's queue entry, wherein updating for each event includes one bit of information for each target object provided to the central queue to indicate that an update would affect the correlating of events subsequent to the each event.

8. The computer program product of claim 7 wherein in the computer readable program code configured to filter the events, each event is tagged with its kind.

9. The computer program product of claim 7 further comprising computer readable program code configured to detect out-of-order processing of an event and correct the out-of-order processing by storing an event history for each target object together with that target object.

10. The computer program product of claim 7 wherein if computer readable program code configured to update the target object for a particular event results in: a new target object being created, a target object being marked end-of-life, or a change to any target object attribute that are used in correlation expressions, then further comprising computer readable program code configured to repeat correlating all events after the particular event.

11. The computer program product of claim 10 further comprising computer readable program code configured to correct the event's central queue entry with respect to the set of state-holding target objects if a different set of state-holding target objects is found by a repeated correlation, and to correct the event's effect on all target objects by processing undo requests for any target objects that the corrected set of state-holding target objects no longer contains.

12. The computer program product of claim 7 wherein there is only one central queue for receiving and tracking an event and there are a plurality of filtering nodes, a plurality of correlation nodes and a plurality of update nodes and wherein the processing of events in the pipelined stages of filtering, correlating and updating are done in the parallel processing environment.

13. An apparatus for processing events in a distributed environment comprising:
- a central queue component for receiving and tracking a plurality of events in their order of arrival, each event having an entry in the central queue;
- at least one filtering node component to determine zero or more kinds for each event received by the central queue component such that filtering the events takes place in a parallel processing environment;
- at least one correlating node component to correlate the events and apply a delivery rule to determine a set of state-holding target objects for each event that will consume the event and update their state wherein the target objects hold all known information about the events, such that correlating the events takes place in the parallel processing environment;
- at least one update node component to update the state-holding target objects for each event such that updating takes place in the parallel processing environment;
- wherein processing of the events is divided into three pipelined stages in the order of the at least one filtering component, the at least one correlating component and the at least one updating component;
- wherein a result for each event of each of filtering the events, correlating the events and updating the target object is recorded in the central queue as part of the event's queue entry, wherein updating for each event includes one bit of information for each target object provided to the central queue to indicate that an update would affect the correlating of events subsequent to the each event; and
- at least one computer processor for hosting the central queue, at least one filtering node component, at least one correlating node component and at least one update node component.

14. The apparatus of claim 13 wherein in the at least one filtering node component, each event is tagged with its kind.

15. The apparatus of claim 13 further comprising detecting out-of-order processing of an event and correcting the out-of-order processing by storing an event history for each target object together with that target object.

16. The apparatus of claim 13 wherein if the at least one update node component updates the target object for a particular event which results in a new target object being created, a target object being marked end-of-life, or a change to any target object attributes that are used in correlation expressions, then the at least one correlating node component further repeats correlation processing for all events after the particular event.

17. The apparatus of claim 16 wherein the event's central queue entry is corrected with respect to the set of state-holding target objects if a different set of state-holding target objects is found by a repeated correlation, and the event's effect on all target objects is also corrected by processing undo requests for any target objects that the corrected set of state-holding target objects no longer contains.

18. The method of claim 13 wherein there is only one central queue component for receiving and tracking an event and there are a plurality of filtering node components, a plurality of correlation node components and a plurality of update node components and wherein the processing of events in the pipelined stages of filtering components, correlating components and updating components are done in a parallel processing environment.

* * * * *